Patented Dec. 8, 1953

2,662,034

UNITED STATES PATENT OFFICE 2,662,034

METHOD OF IMPREGNATING AN OXIDE COATING ON ALUMINUM AND RESULTING ARTICLE

Ralph B. Mason and William C. Cochran, New Kensington, Pa., assignors to Aluminum Company of America, Pittsburgh, Pa., a corporation of Pennsylvania No Drawing. Application July 14, 1950, Serial No. 173,956

10 Claims. (Cl. 117—49)

1

This invention relates to aluminum articles having oxide coatings and to methods of impregnating oxide coatings on aluminum with resin, providing inter alia new methods of sealing and/or coloring such oxide coatings.

As generally used herein, the word "aluminum" includes aluminum of various degrees of purity and aluminum base alloys. The term "oxide coating" includes only those oxide coatings which are artificially formed on aluminum, as distinguished from the natural films of oxide which are normally present on aluminum surfaces. The present invention is applicable to various kinds of oxide coatings, and has particularly striking advantages when applied to anodic coatings, particularly those produced in electrolytes containing sulfuric acid. Therefore, the invention will be described in most detail in connection with coatings of the type last mentioned.

Anodic oxide coatings are formed on aluminum by electrolytic treatment in acid solutions; they consist principally of aluminum oxide and may contain some ions adsorbed from the electrolyte. They are generally harder and more resistant to abrasion than the metal on which they are formed. Further, it is generally recognized that such coatings are inherently porous and adsorbent, although the pores are too small to be seen even under the microscope. An idea of the size of the pores is obtained from the fact that there may be as many as one trillion pores per square inch. In general, the pores are large enough to permit the entrance of water and aqueous solutions of some substances, but they are not large enough to admit many substances of colloidal dispersion. Under some conditions, the outer ends of the pores are substantially enlarged as a result of the solvent action of the forming electrolyte, and there is some penetration of the pore walls near the surface. Thus, a very thin surface portion of the coating may be spongy in character. Both the pores and the spongy surface layer of the coatings are adsorbent and capable of being impregnated with certain substances. Many clear liquids such as varnishes and lacquers, however, cannot be made to penetrate the pores of oxide coatings on aluminum because the dispersion of their constituents is not sufficiently fine. There are, of course, many statements in the literature and prior patents to the effect that oxide coatings on aluminum have been impregnated with varnishes and lacquers, or similar materials, but it is our observation that only the spongy surface layer of the coating is penetrated by such materials if there is any appreciable penetration at all.

2

Oxide coatings on aluminum may be easily stained or colored unless suitably sealed. Whether or not they are deliberately colored, they are usually treated before commercial use to seal them against staining or undesired coloring. Similarly certain so-called sealing treatments are employed to render such coatings more resistant to corrosion. One of the best known sealing treatments is the hot water sealing treatment, which is generally used to prevent staining or undesired coloring of oxide coatings, without itself coloring the coatings. This sealing treatment is open to the objection that it tends to soften the outer part of the coating and produce a chalky surface layer. To provide greater resistance to corrosion, oxide coatings are sometimes treated in aqueous solutions containing corrosion inhibiting substances, such as dichromates, which may impart a color to the coating.

Oxide coatings on aluminum are rather heat stable, yet on heating to temperatures as low as 225° F. the coatings may become crazed because of the difference in the expansivity coefficients of the oxide and the aluminum. The ordinary sealing treatments for oxide coatings do not require subjecting the coatings to temperatures at which crazing occurs; neither do they improve the resistance of the coatings to crazing. For example, hot water sealing is ordinarily effected at about 210° F., but usually increases the tendency of the coatings to craze at more elevated temperatures.

Another important property of oxide coatings on aluminum is that of providing a good dielectric medium. When this property is checked by measuring break-down voltages, it is often found that the coatings have dielectric values somewhat lower than would be expected, perhaps because of weak spots in the coatings. The ordinary sealing treatments tend to increase the dielectric values of such coatings only slightly.

As suggested by the foregoing remarks, a general object of the invention is to improve various properties of oxide coatings on aluminum. Specific objects include the provision of new methods of: impregnating oxide coatings, with or without coloring; sealing such coatings against staining, undesired coloring and/or corrosion, without softening the surface or making it chalky; reducing, or minimizing the effects of, elevated temperature crazing on such coatings; increasing the dielectric values of such coatings; and generally combining, with the usual properties of such coatings, the additional properties attainable by impregnation of the same with resins. The invention has as a particular object the production of aluminum articles having oxide coatings which are impregnated with synthetic resins (and, if desired, sealed and/or colored and/or overcoated with such resins). Other objects and advantages will appear upon a reading of the following description of the invention and examples.

We have discovered that vapors of ordinary synthetic resin forming substances can be adsorbed by oxide coatings on aluminum with formation of resins therein by polymerization reactions. As a result, we have been able to produce aluminum articles having oxide coatings which are impregnated with resins substantially throughout their pore structure, in contrast to having mere overlying surface coatings of resins as is the case with prior methods.

In practicing the methods of our invention, an oxide coating is exposed, at elevated temperatures, to the vapors of one or more organo-carbon compounds providing the necessary resin forming reactants. We may use a single resin forming monomer, the molecules of which are the only necessary reactants for either addition polymerization (as with styrene) or condensation polymerization (as with dimethylol urea). Alternatively, we may use two or more monomeric resin forming substances, the molecules of which are the only necessary reactants for condensation polymerization (as with phenol and formaldehyde). Further, it is not always necessary to obtain the vapors from monomers or monomeric substances, since various low polymers of the desired reactant molecules are capable of providing monomeric reactants.

As a general method for the invention, we heat the substance or substances providing the vapors employed to at least 200° F., thus increasing the vapor pressure of the substance or substances employed and providing vapor concentrations favoring adsorption by the oxide coating. Further, the heating promotes the formation of resin in the coating by polymerization. Of course the heating should not be carried to temperatures beyond that at which the particular resin being formed will char or soften to an undesired extent. For example, we merely insert an oxide coated aluminum article and a small quantity of the substance or substances capable of providing the desired vapors in a suitable container, close the container, and heat the same for a short time. Upon removing the articles from the container, we have found that the oxide coating is impregnated with a resin and sometimes is, in addition, overcoated with the resin. Even when the container is made of aluminum, the resin formation is confined to the oxide coating and does not take place on the container walls.

We have found that we can effectively impregnate both colored and plain oxide coatings on aluminum (and, if desired, overcoat the same) with synthetic resins for many purposes. We can employ synthetic resin forming reactants producing colorless resins, or resins having various desired colors which are imparted to the oxide coatings. We have found that the resin impregnation may readily be carried to the point of effectively sealing the coating against staining, undesired coloring and/or corrosion. Further, we can perform the methods of the invention at temperatures that ordinarily cause crazing and yet protect the oxide coating from exhibiting elevated temperature crazing effects. We have also found that we can produce coatings with greatly improved dielectric values. In general, we can produce resin impregnated oxide coatings having the desirable added properties of resin coatings.

The resin impregnated oxide coatings produced by the methods of our invention are to be distinguished from oxide coatings provided with overlying coatings or films of resinous and like substances, such as are obtained with varnishes and lacquers, inasmuch as the coatings treated by our methods are actually impregnated with resin substantially throughout their pore structure rather than merely overcoated with resin. Further, the impregnation process may be carried to just the desired degree, without resin overcoating or fillet formation in corners of the coated article, for example, or with resin overcoating, if desired. It is our observation that the use of substances of low molecular weight, in the vapor phase, permits of the penetration of such substances into the pores and other interior voids in oxide coatings whereas it would not be possible to obtain such penetration by the use of partly polymerized or other high molecular weight substances, such as varnishes or lacquers, especially when applied in the liquid phase.

In accordance with our invention, we have impregnated oxide coatings on aluminum with a wide variety of synthetic resins. We have employed monomeric synthetic resin forming reactants, such as phenol and formaldehyde, which enter into condensation reactions and form resins by condensation polymerization. Likewise, we have employed synthetic resin forming monomers, such as styrene, which enter into addition reactions and form resins by addition polymerization. The resinification process takes place in and on the coating by either of the two types of polymerization reactions described, or by combinations thereof. Either thermo-setting resins or thermo-plastic resins may be formed in and on oxide coatings by our methods. The resin forming reactants, in vapor phase, are the only reactants required for the resinification process, although it is believed that the oxide coating has a catalytic effect favoring polymerization of the reactants.

We have impregnated oxide coatings with phenolic resins by our methods, using phenol and formaldehyde or a formaldehyde donor. We have formed urea resins in such coatings, using either dimethylol urea or urea and formaldehyde. We have formed aniline resins in such coatings, using aniline and formaldehyde. We have formed alkyd resins in such coatings, using glycerol or ethylene glycol and phthalic anhydride. We have formed various vinyl type resins in such coatings, using styrene or methyl methacrylate, for example. These and other types of resins will be mentioned in the examples.

We have formed resins in many different types of oxide coatings on aluminum. Of the anodic oxide coatings (formed in acid electrolytes), we have treated coatings formed in electrolytes containing sulfuric acid, electrolytes containing oxalic acid, and electrolytes containing chromic acid. The coatings formed in the named types of electrolytes were all receptive to resin impregnation by our methods, although those formed in sulfuric acid electrolytes were especially receptive to phenolic resin impregnation, for example. We have also impregnated oxide coating with resins, by our methods, after forming the coatings by simple chemical action in alkaline solutions, e. g. those containing sodium carbonate and sodium chromate. As for these and other coatings not formed in sulfuric acid-containing solutions, we have found that their receptiveness to some types of resin impregnation may be improved, in some cases considerably, by preliminarily rinsing the coatings in a sulfuric acid-containing solution and then drying. Examples of various methods of practicing our invention follow.

Phenolic resins

Phenolic resins are a particularly useful class of resins readily formed in oxide coatings on aluminum by our methods, and several experiments with vapors forming such resins will be described. A series of 2S–H16 aluminum panels measuring 2″ x 3¾″ were oxide coated under the conditions hereinafter mentioned. They were then placed in stainless steel cans, each having a total volume of about 32 cubic inches and containing a fraction of a gram of resin forming material. The cans were closed with tightly fitting covers to conserve the resin forming material, and heated at various temperatures and for various lengths of time, all as hereinafter mentioned.

A panel having a coating (hereinafter called a standard sulfuric anodic coating), formed by anodizing in a 15 per cent sulfuric acid electrolyte for 30 minutes at 70° F. with a current density of 12 amperes per square foot, was impregnated with phenolic resin, and thus sealed against staining by dyes, by exposure to the vapors given off by 0.184 gram of phenol and 0.101 gram of paraformaldehyde (paraform, a formaldehyde donor) upon heating for 30 minutes at 380° F. A second panel having a coating formed by anodizing in 65 per cent sulfuric acid for 10 minutes at 81° F. with the same current density, was also impregnated and sealed in the same manner as the first. A third panel having a coating formed by anodizing in a 10 per cent chromic acid electrolyte for 30 minutes at 100° F. with a potential of 40 volts, was impregnated with a small amount of resin in a manner similar to the first. However, a fourth panel, oxide coated like the third but rinsed in 1 per cent sulfuric acid solution, was more heavily impregnated and sealed by the same procedure as the first. A fifth panel having a coating formed by anodizing in 5 per cent oxalic acid for 30 minutes at 65° F., with a current density of 12 amperes per square foot, was impregnated and sealed against all but very faint staining by dyes by the vapor treatment first described. A sixth panel having a coating formed by simple chemical action in a carbonate-chromate type of solution was impregnated with resin by the treatment first described.

Additional panels were treated by exposure to the vapors given off by phenol and paraformaldehyde, generally in the manner first described, but with the variations now to be indicated. The panels had been given standard sulfuric anodic coatings. The temperatures of the vapors were varied from about 275 to 440° F., and the times of exposure were varied from about 5 to 120 minutes. It was found that maximum weights of resin were formed in the coating, with complete sealing, in 10 to 15 minutes at temperatures between 380 and 440° F., and in 20 to 60 minutes at temperatures between 275 and 340° F. The coatings were light green-yellow when sealed at low temperatures, and mahogany brown when sealed at high temperatures, with colors at intermediate temperatures varying from yellow brass to deep gold to copper. No visible crazing of the coatings was observed within the limits of time or temperature chosen for these experiments. Similar results were obtained on other panels at temperatures as low as about 225° F. and as high as about 510° F.

Further tests were made to determine whether the ratio of phenol to paraformaldehyde was particularly critical. Weight ratios between about 0.5:1 and 4:1 were effective, and did not seem to exhaust the possible range of ratios that could be used. Likewise, it was found that the amount of resin forming material employed could be varied considerably, since total amounts between about 0.142 and 0.570 gram were effective with specimens of the size first indicated.

Panels similar to those heretofore mentioned, but of 24S–T6 aluminum alloy were anodized in 15 per cent sulfuric acid for 30 minutes at 70° F. with current densities of both 12 and 24 amperes per square foot. They were exposed to vapors from 0.3 cc. of 1:1 mixtures of phenol and trioxane (alpha-trioxymethylene, a formaldehyde donor) for 30 minutes at 380° F. Both types of coatings were effectively impregnated and sealed by this treatment. Their color was light brown. Other panels from the 2S–H16 group, having coatings formed by anodizing in 65 per cent sulfuric acid electrolytes for 5 and 10 minutes at 80° F. with a current density of 12 amperes per square inch, were also similarly impregnated and sealed by exposure to vapors from phenol and trioxane for one hour at 430° F. The latter treatment not only filled the pores and other voids of the coating with resin, but also produced a resin overcoating which is highly resistant to electrical breakdown. The color was orange brown.

Panels of 53S and 63S aluminum alloy measuring 1⅝″ x 6″ were provided with standard sulfuric anodic coatings and placed in aluminum cans with tight fitting lids, along with less than 1 gram of phenol and less than 1 cc. of formaldehyde solution (formalin). The cans were placed in the oven for 30 minutes at temperatures of about 310° F. Resin impregnated coatings were produced which were yellow in color and highly resistant to corrosion. Experiments in which the vapors were developed in a pressure tight container were also conducted, but it was found that pressures of 3 to 15 pounds per square inch higher than atmospheric could be employed but were not necessary.

Other phenolic type resins may of course be formed in oxide coatings on aluminum by using other phenols and various aldehydes or ketones.

Urea resins

Panels of 63S aluminum alloy having standard sulfuric anodic coatings were placed in an aluminum can with a small quantity of dimethylol urea (an unpolymerized primary condensation product of urea and formaldehyde). The can was covered and heated at 360 to 387° F. for 83 minutes. The coatings were found to be impregnated with colorless resin, and were sealed against staining.

Additional panels having similar coatings were exposed to vapors from urea and formaldehyde solution at 220° F. for 35 minutes. The treated coatings were susceptible of only slight staining by dyes.

Other urea type resins may of course be formed in oxide coatings on aluminum by using thiourea, guanidine, melamine, sulfonamid or aniline (see below) and various aldehydes or ketones.

Aniline resins

Panels of 2S aluminum having standard sulfuric anodic coatings were exposed to vapors of aniline and trioxane for 30 minutes at 500° F. A sealed yellow brass colored coating was produced having a heavy overlayer of resin.

Alkyd resins

Panels of 2S, 53S and 63S aluminum alloy were given standard sulfuric anodic coatings and then exposed to vapors of phthalic anhydride and glycerol for a half hour at about 360° F. The coatings were found to be sealed against dyes and more resistant to corrosion than similar coatings sealed in hot water. The coatings were colorless.

Similar results may be obtained by using other polybasic acids (such as maleic anhydride) and various polyhydric alcohols (such as ethylene glycol).

Polystyrene resins

Panels of 2" x 3" size, 2S aluminum, having standard sulfuric anodic coatings, were placed in a stainless steel beaker, with small amounts of polystyrene resin forming substances, and covered. With cinnamic acid (a styrene donor), heated to 375° F. for 30 minutes, the coatings become impregnated with colorless polystyrene resins, were sealed against staining, and were water-repellent. Similar results were obtained on 53S and 63S aluminum alloy panels having the same type of coating, when exposed to vapors of a styrene solution at 305° F. for about 3½ hours. A cream colored coating developed at 380 to 390° F. after 30 minutes.

Polymethyl methacrylate resins

Panels of 53S and 63S aluminum alloy having standard sulfuric acid coatings have been sealed by exposure to vapors of methyl methacrylate for about 3½ hours at 392° F.

Acrolein resins

A piece of extruded 63S aluminum alloy was given a standard sulfuric anodic coating and exposed to acrolein vapors generated upon heating glycerol and a catalyst such as potassium acid sulfate. These vapors were adsorbed by the oxide coating and polymerized to form resin. In a series of experiments, temperatures were varied from about 390 to 515° F. while treatment times were varied from 10 to 120 minutes. It was found that a maximum weight of resin formed in the coating in about 20 minutes at about 480° F. At the lower temperatures the resin was practically colorless, while the resin was tan in color at the higher temperatures.

Allyl resins

Panels of 53S and 63S aluminum alloy having standard sulfuric anodic coatings have been sealed by exposure to vapors of allyl diglycol carbonate for about 2 hours at 348 to 374° F. The coatings acquired a yellow tan color.

Furane resins

Panels of 63S aluminum alloy having standard sulfuric anodic coatings were placed in an aluminum can with a small quantity of furfural for about 30 minutes at 395° F. The coatings were found to be impregnated with a yellow cream colored resin and sealed against corrosion.

Panels of 53S and 63S aluminum alloys having standard sulfuric anodic coatings have been sealed by exposure to vapors of furfuryl alcohol for about 2 hours at 350° F. Orange brown colors were produced. Similar tests on an oxide coated aluminum-magnesium alloy, with various thicknesses of oxide coating (produced by varying the anodizing time) produced coatings with colors ranging from yellow gold to reddish purple.

From these examples it is clear that the invention may be practiced with wide variation in specific operating conditions.

We claim:

1. A method of impregnating an adsorbent artificially formed oxide coating on aluminum with resin, which consists in exposing the oxide coating to the vapors of at least one ordinary organo-carbon substance providing monomeric synthetic resin forming reactants, in a closed container, at a temperature of at least about 200° F., whereby the vapors are adsorbed by the coating and therein polymerized to a resin.

2. The method of claim 1 in which the vapors are at a temperature between about 275 and 440° F. and the exposure time is about 15 minutes to one hour.

3. The method of claim 1 in which the coating is exposed to vapors of a phenol and an aldehyde.

4. The method of claim 1 in which the coating is exposed to vapors of a urea and an aldehyde.

5. The method of claim 1 in which the coating is exposed to vapors of phthalic anhydride and glycerol.

6. The method of claim 1 in which the coating is exposed to vapors of styrene.

7. The method of claim 1 in which the coating is exposed to the vapors of furfuryl alcohol.

8. A method of impregnating an adsorbent artifically formed oxide coating on aluminum with resin, which consists in rinsing the oxide coating in a sulfuric acid-containing solution and drying and thereafter exposing the oxide coating to the vapors of at least one ordinary organo-carbon substance providing monomeric synthetic resin forming reactants, in a closed container, at a temperature of at least about 200° F., whereby the vapors are adsorbed by the coating and therein polymerized to a resin.

9. A method of impregnating an adsorbent oxide coating formed on aluminum by electrolysis in a sulfuric acid-containing solution, which consists in exposing the oxide coating to the vapors of at least one ordinary organo-carbon substance providing monomeric synthetic resin forming reactants, in a closed container, at a temperature of at least about 200° F., whereby the vapors are adsorbed by the coating and therein polymerized to a resin.

10. An aluminum article having a porous artificially formed oxide coating which has been impregnated substantially throughout with an ordinary synthetic organo-carbon resin in accordance with the method of claim 1.

RALPH B. MASON.
WILLIAM C. COCHRAN.

References Cited in the file of this patent

UNITED STATES PATENTS

| Number | Name | Date |
| --- | --- | --- |
| 2,174,887 | Kiefer | Oct. 3, 1939 |
| 2,214,876 | Clark | Sept. 17, 1940 |
| 2,306,222 | Patnode | Dec. 22, 1942 |
| 2,376,706 | Lum | May 22, 1945 |
| 2,418,935 | Hutchinson | Apr. 15, 1947 |
| 2,424,621 | McClatchey | July 29, 1947 |
| 2,448,513 | Brennan et al. | Sept. 7, 1948 |